United States Patent
Wang et al.

(10) Patent No.: US 12,011,044 B2
(45) Date of Patent: Jun. 18, 2024

(54) POWER SUPPLY ASSEMBLY AND ELECTRONIC ATOMIZING DEVICE

(71) Applicant: SHENZHEN SMOORE TECHNOLOGY LIMITED, Shenzhen (CN)

(72) Inventors: Xinyu Wang, Shenzhen (CN); Wenxiao Xu, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 829 days.

(21) Appl. No.: 17/147,670

(22) Filed: Jan. 13, 2021

(65) Prior Publication Data

US 2021/0219620 A1 Jul. 22, 2021

(30) Foreign Application Priority Data

Jan. 16, 2020 (CN) .......................... 202010045227.3

(51) Int. Cl.
*A24F 47/00* (2020.01)
*A24F 40/40* (2020.01)
*A24F 40/50* (2020.01)
*H02J 7/00* (2006.01)

(52) U.S. Cl.
CPC .............. *A24F 40/50* (2020.01); *A24F 40/40* (2020.01); *H02J 7/0045* (2013.01); *H02J 7/0063* (2013.01)

(58) Field of Classification Search
CPC ....................................................... A24F 40/40
See application file for complete search history.

(56) References Cited

U.S. PATENT DOCUMENTS

2018/0310628 A1 11/2018 Qiu

FOREIGN PATENT DOCUMENTS

| CN | 203492790 U | 3/2014 |
|----|-------------|--------|
| CN | 103720055 A | 4/2014 |
| CN | 204796733 U | 11/2015 |
| CN | 108851252 A | 11/2018 |
| CN | 109007980 A | 12/2018 |
| CN | 110226778 A | 9/2019 |
| CN | 209357801 U | 9/2019 |
| JP | H10106517 A | 4/1998 |

*Primary Examiner* — Eric Yaary
(74) *Attorney, Agent, or Firm* — Dorsey & Whitney LLP

(57) ABSTRACT

The present disclosure relates to a power supply assembly and an electronic atomizing device. The power supply assembly includes a battery, an electrode post electrically connected to the battery, a sealing member, and a support. The battery supplies power to the atomizer through the electrode post. The sealing member is provided with a through hole, and the electrode post extends through the through hole. The support has a first abutting surface. The battery and the sealing member are disposed in the support. When a difference between a pressure of one end of the sealing member adjacent to the battery and a pressure of the other end of the sealing member away from the battery is greater than a threshold pressure, the sealing member presses against the first abutting surface, and is deformed to seal a clearance between the electrode post and the sealing member in the through hole.

20 Claims, 14 Drawing Sheets

POWER SUPPLY ASSEMBLY AND ELECTRONIC ATOMIZING DEVICE

CROSS REFERENCE TO RELATED APPLICATION

This application claims priority to Chinese Patent Application No. 2020100452273, filed on Jan. 16, 2020, the entire content of which is incorporated herein in its entirety.

TECHNICAL FIELD

The present disclosure relates to the field of electronic atomizing technology, and in particular, relates to a power supply assembly and an electronic atomizing device including the same.

BACKGROUND

Electronic atomizing devices have an appearance and taste similar to those of ordinary cigarettes, but usually do not contain other harmful components such as tar and suspended particles in cigarettes. Therefore, the electronic atomizing devices are commonly used as substitutes for the cigarettes. However, for the conventional electronic atomizing device, when a power supply assembly thereof explodes under extreme conditions, the electronic atomizing device will cause different degrees of injuries to consumers, resulting in that the safety of the electronic atomizing device is difficult to meet user's needs.

SUMMARY

According to various embodiments of the present disclosure, power supply assemblies and electronic atomizing devices including the same are provided.

A power supply assembly of an electronic atomizing device is configured to supply energy to an atomizer of the electronic atomizing device, and includes:
- a battery and an electrode post electrically connected to the battery, the battery supplying power to the atomizer through the electrode post;
- a sealing member provided with a through hole, the electrode post extending through the through hole; and
- a support having a first abutting surface. The battery and the sealing member are disposed in the support. When a difference between a pressure of one end of the sealing member adjacent to the battery and a pressure of the other end of the sealing member away from the battery is greater than a threshold pressure, the sealing member presses against the first abutting surface, and the sealing member is deformed to seal a clearance between the electrode post and the sealing member in the through hole.

In one of the embodiments, the threshold pressure is in a range of 1 KPa to 2 MPa.

In one of the embodiments, the threshold pressure is in a range of 2 KPa to 2 MPa In one of the embodiments, the threshold pressure is in a range of 10 KPa to 1 MPa In one of the embodiments, when a pressure difference acting on the sealing member is greater than the threshold pressure, the electrode post and the through hole are in an interference fit, and an interference between the electrode post and the through hole is in a range of 0.01 mm to 0.1 mm.

In one of the embodiments, the power supply assembly further includes a circuit board disposed in the support. The electrode post is electrically connected to the circuit board.

In one of the embodiments, the power supply assembly further includes a mounting base mounted on the circuit board. The electrode post is fixed on the mounting base.

In one of the embodiments, the mounting base has a second abutting surface. The electrode post protrudes with respect to the second abutting surface. The sealing member is further provided with an accommodating cavity. The through hole is disposed on a top wall surface enclosing the accommodating cavity. The mounting base is sleeved in the accommodating cavity. The second abutting surface abuts against the top wall surface.

In one of the embodiments, the first abutting surface is provided with a mounting hole. When the difference between the pressure of the end of the sealing member adjacent to the battery and the pressure of the other end of the sealing member away from the battery is greater than the threshold pressure, the sealing member is deformed to be in an interference fit with the mounting hole.

In one of the embodiments, the sealing member includes a base portion having a third abutting surface. The through hole is disposed on the base portion. The third abutting surface is capable of pressing against the first abutting surface.

In one of the embodiments, the sealing member further includes a protrusion disposed on the third abutting surface. The through hole extends to the protrusion. The protrusion is capable of being deformed to be in an interference fit with the mounting hole.

In one of the embodiments, the sealing member includes a silicone sealing member.

In one of the embodiments, the power supply assembly further includes a protective cover. The protective cover includes a bottom plate portion and a side cylinder portion connected around the bottom plate portion. The side cylinder portion is sleeved on the support. The bottom plate portion covers the sealing member. The electrode post extends through the bottom plate portion.

In one of the embodiments, the power supply assembly further includes a housing. The support is sleeved in the housing. The housing and the support enclose a mounting cavity. A portion of the electrode post protruding from the sealing member is located in the mounting cavity. The mounting cavity is configured to be matched with the atomizer.

In one of the embodiments, the support and the housing enclose a receiving cavity configured to receive the battery. The support is provided with an exhaust hole. The exhaust hole provides a communication between outside and the receiving cavity.

An electronic atomizing device includes an atomizer and the power supply assembly as described above. The atomizer is connected to the power supply assembly.

In one of the embodiments, the electronic atomizing device further includes a magnetic attraction member disposed on the support and magnetically connected to the atomizer.

When the battery is in an abnormal state such as an explosion, the explosion of the battery will cause the gas pressure in the support to increase sharply, resulting in that the pressure difference acting on the sealing member is greater than the threshold pressure. Due to the limiting of the first abutting surface, the sealing member can be prevented from being released from the support under the impact of high-pressure gas. Moreover, under the pressure difference, the sealing member is deformed to seal the clearance between the electrode post and the sealing member in the through hole, thereby preventing the harmful gas generated by the explosion of the battery from entering the atomizer through the clearance and from being inhaled by the user, improving the safety of the electronic atomizing device.

DETAILED DESCRIPTION OF THE EMBODIMENTS

Figure 1:
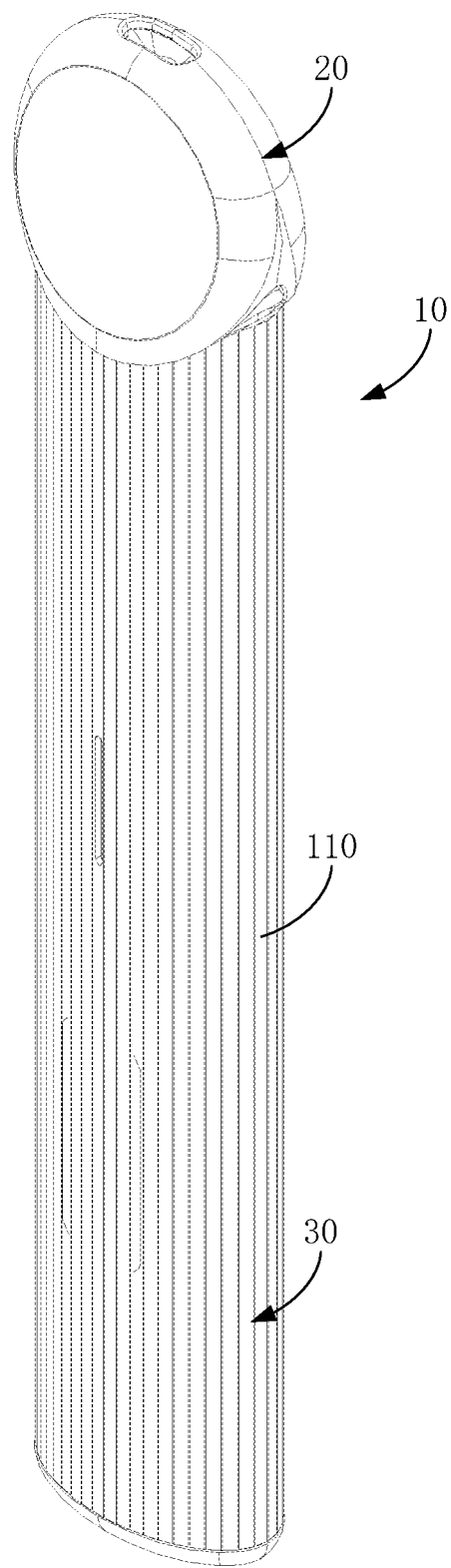
FIG. 1 is a perspective view of an electronic atomizing device according to an embodiment.

For the convenience of understanding of the present disclosure, the present disclosure will be described more fully with reference to related drawings. Preferred embodiments of the present disclosure are illustrated in the drawings. However, the present disclosure can be implemented in many different forms and is not limited to the embodiments described herein. In contrast, providing these embodiments is to providing a fully and thoroughly understanding of the disclosure of the present disclosure.

It should be noted that when an element is referred as to be "fixed" to another element, it can be directly on another element or there may be an intermediate element therebetween. When an element is considered to be "connected" to another element, it may be directly connected to another element or there may be an intermediate element therebetween at the same time. The terms "inner", "outer", "left", "right" and the like used herein are for illustration only and are not meant to be the only embodiment.

Figure 2:
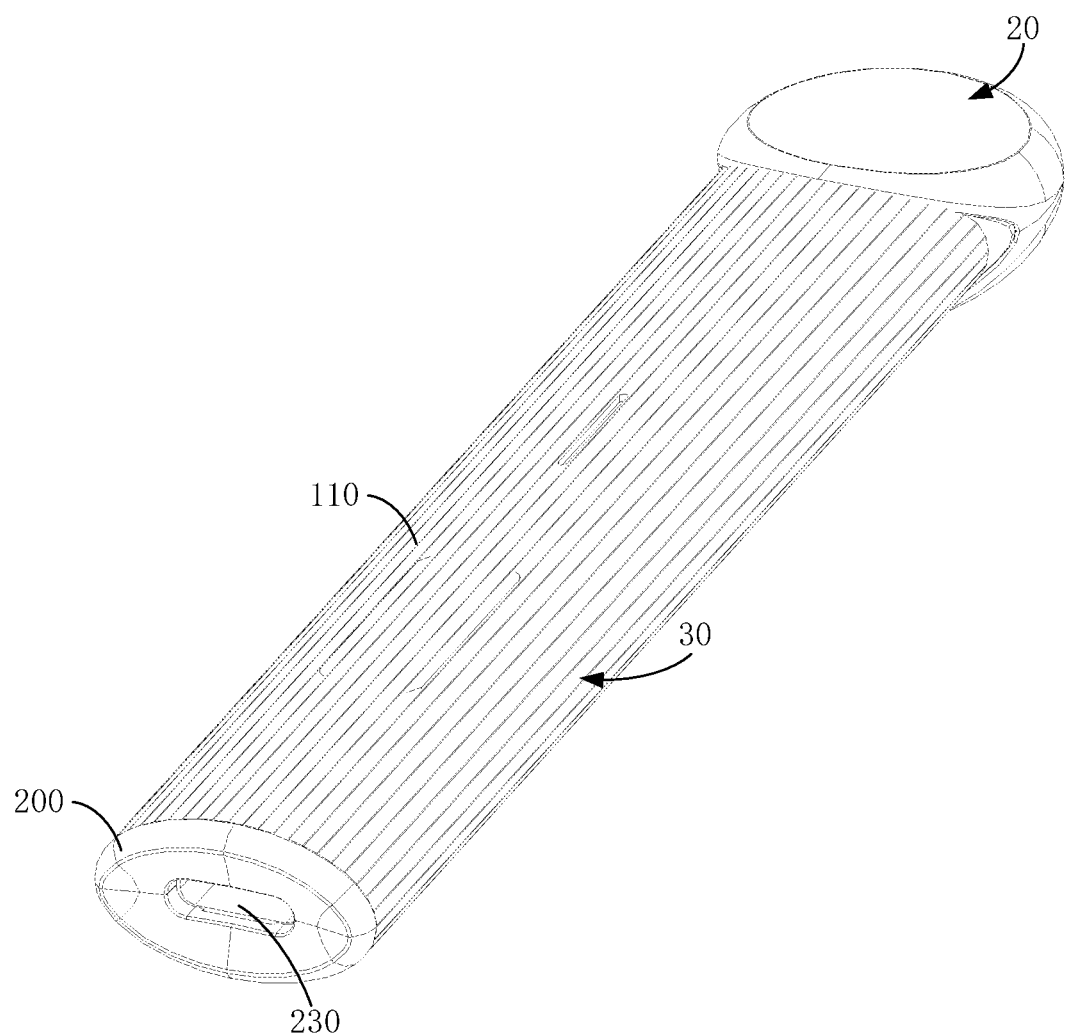
FIG. 2 is a perspective view of the electronic atomizing device of FIG. 1 from another perspective.
Figure 5:
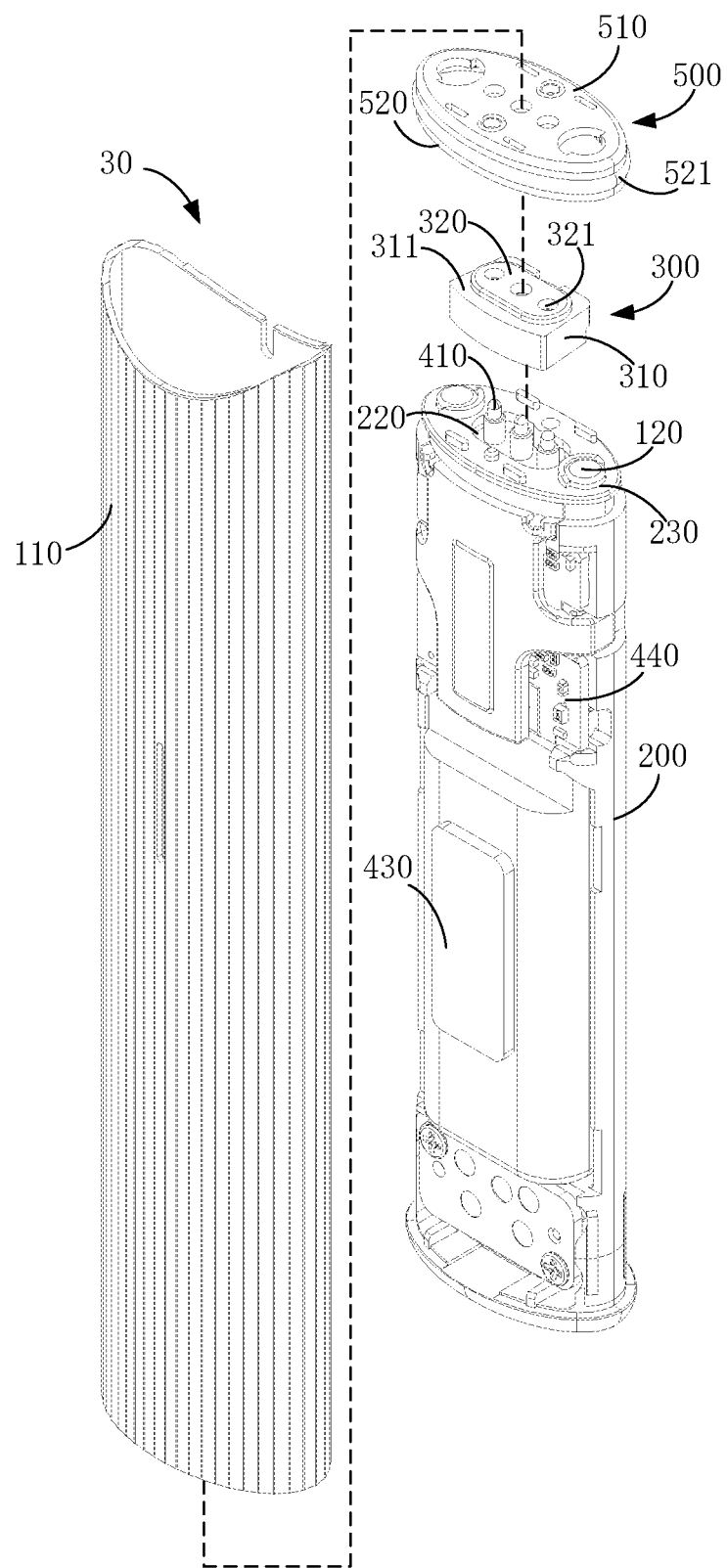
FIG. 5 is an exploded view of the power supply assembly of FIG. 4.
Figure 6:
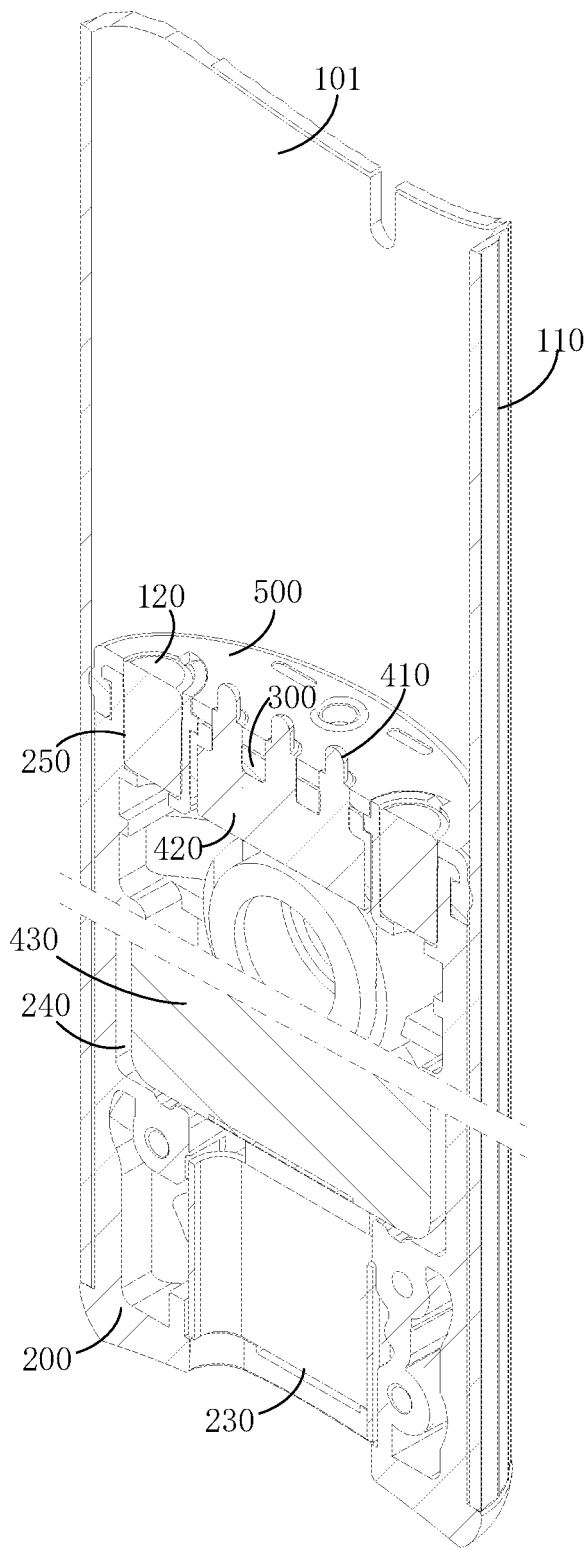
FIG. 6 is a perspective cross-sectional view of the power supply assembly of FIG. 4 in an assembling state.

Referring to FIGS. 1 and 2, an electronic atomizing device 10 according to an embodiment of the present disclosure includes an atomizer 20 and a power supply assembly 30. The atomizer 20 is connected to the power supply assembly 30. The power supply assembly 30 is used to supply power to the atomizer 20. The atomizer 20 converts electrical energy into heat energy, so that aerosol generating substrates accommodated in the atomizer 20 absorbs heat and then is atomized to form smoke for inhalation. Referring to FIGS. 5 and 6, the power supply assembly 30 includes a housing 110, a support 200, a sealing member 300, electrode posts 410, a mounting base 420, a battery 430, a circuit board 440, and a protective cover 500.

Figure 3:
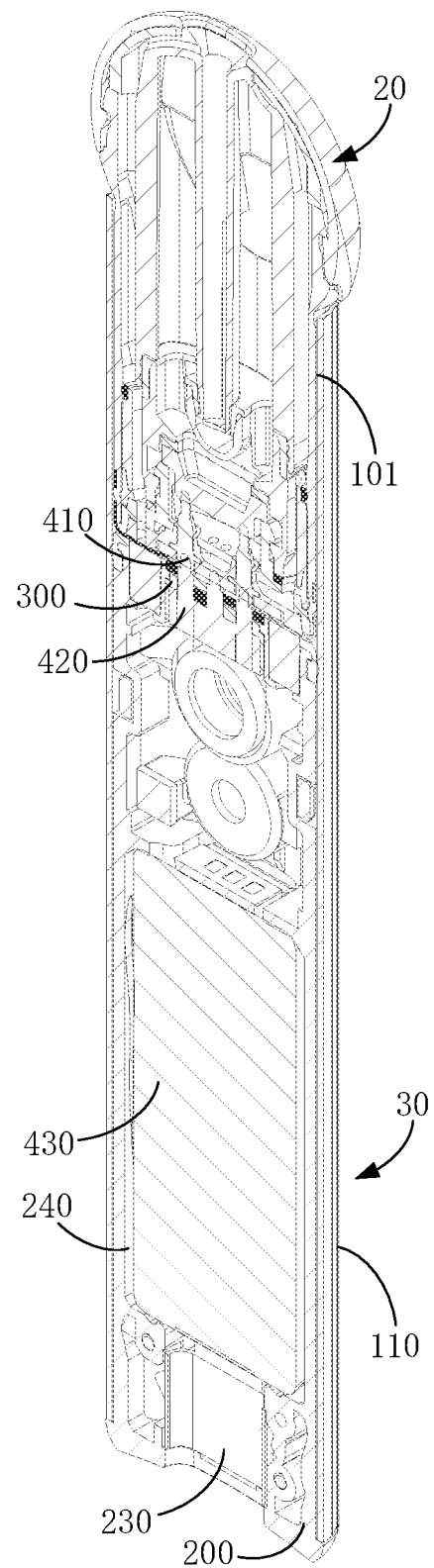
FIG. 3 is a perspective cross-sectional view of the electronic atomizing device of FIG. 1.
Figure 4:
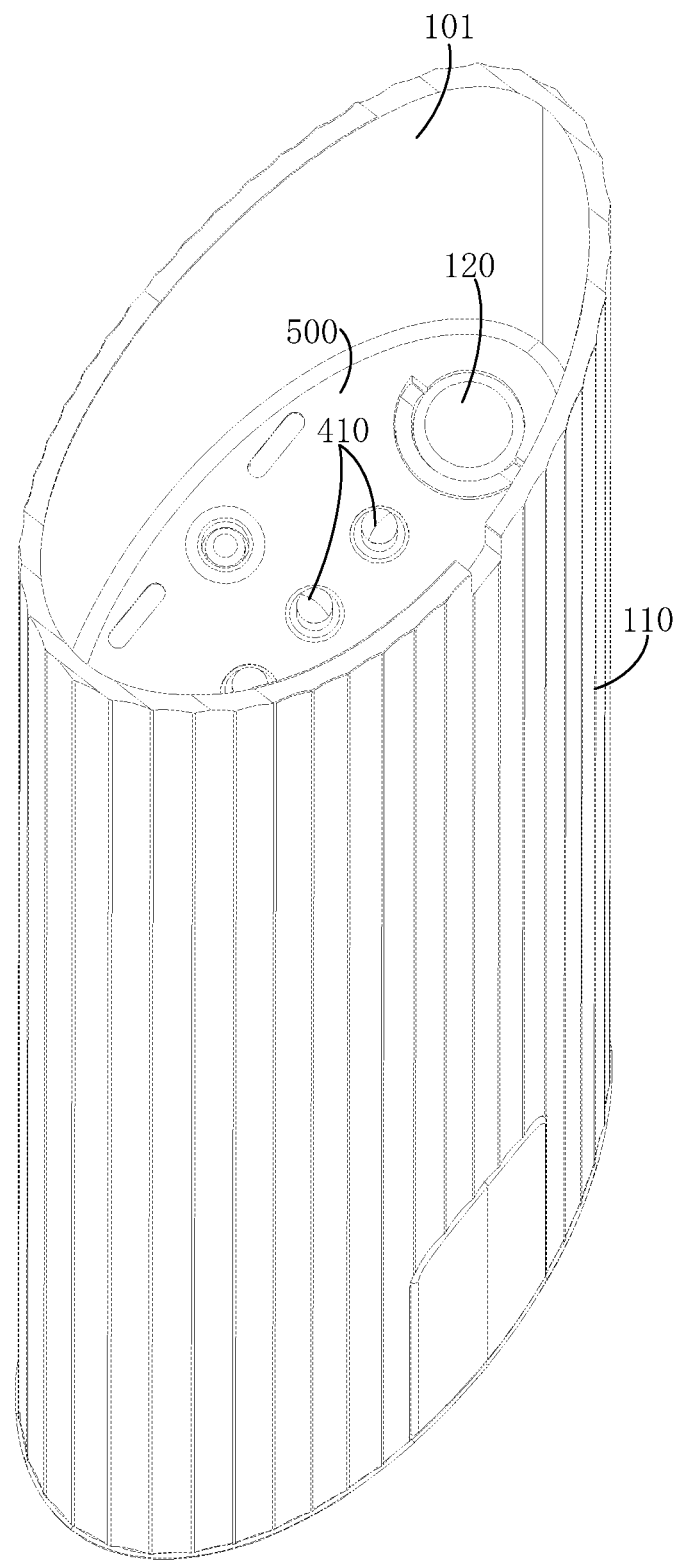
FIG. 4 is a perspective view of a power supply assembly of the electronic atomizing device of FIG. 1.

Referring to FIGS. 3 and 4, in some embodiments, the housing 110 is substantially an elongated cylindrical structure. The support 200 is sleeved in the housing 110, that is, a part of a cavity enclosed by the housing 110 is used to receive the support 200. In addition, the remaining part of the cavity enclosed by the housing 110 forms a mounting cavity 101. In other words, the mounting cavity 101 is cooperatively enclosed by the housing 110 and the support 200. A part of the atomizer 20 is received in the mounting cavity 101, and the remaining part of the atomizer 20 is exposed outside the mounting cavity 101 for the user to inhale the smoke.

Referring to FIGS. 3, 4, and 6, the electronic atomizing device 10 may further include a magnetic attraction member 120. The support 200 is provided with an inserting hole 250. The magnetic attraction member 120 is substantially cylindrical, and the magnetic attraction member 120 is inserted in the inserting hole 250. When the atomizer 20 is located in the mounting cavity 101, the magnetic attraction member 120 generates a magnetic attraction to the atomizer 20, so as to fix the atomizer 20 on the power supply assembly 30, so that the atomizer 20 is detachably connected to the power supply assembly 30. When the atomizer 20 is required to be detached from the power supply assembly 30, it is only necessary to apply a force to the part of the atomizer 20 that is exposed outside the mounting cavity 101, so that the atomizer 20 is separated from the support 200 against the magnetic attraction and then is removed from the mounting cavity 101. Of course, in other embodiments, the atomizer 20 can also be detachably connected to the power supply assembly 30 through a threaded connection or a snap-fitting connection. The atomizer 20 and the power supply assembly 30 can also be fixed together through a non-detachable connection.

Referring to FIGS. 5 and 6, the circuit board 440, the mounting base 420, and the battery 430 are all disposed in the support 200. Specifically, the housing 110 and the support 200 enclose a receiving cavity 240 in which the battery 430 is located. The support 200 is provided with an exhaust hole 230, and the exhaust hole 230 provides a communication between the receiving cavity 240 and the outside. The mounting base 420 may be substantially in a rectangular parallelepiped shape and mounted on the circuit board 440 through a surface mounted technology (SMT) process. The electrode posts 410 are fixedly connected to the mounting base 420. The circuit board 440 may be a printed circuit board or a flexible circuit board. One end of the circuit board 440 is connected to the mounting base 420, and the other end of the circuit board 440 is connected to the battery 430. The electrode post 410 is electrically connected to the battery 430 through the mounting base 420 and the circuit board 440. When the atomizer 20 is located in the mounting cavity 101, the electrode post 410 abuts against an electrode contact in the atomizer 20, so that the battery 430 supplies power to the atomizer 20 to atomize the aerosol generating substrate to form the smoke. In other embodiments, the mounting base 420 may be omitted, and the electrode post 410 may be directly fixed on the circuit board 440.

Figure 10:
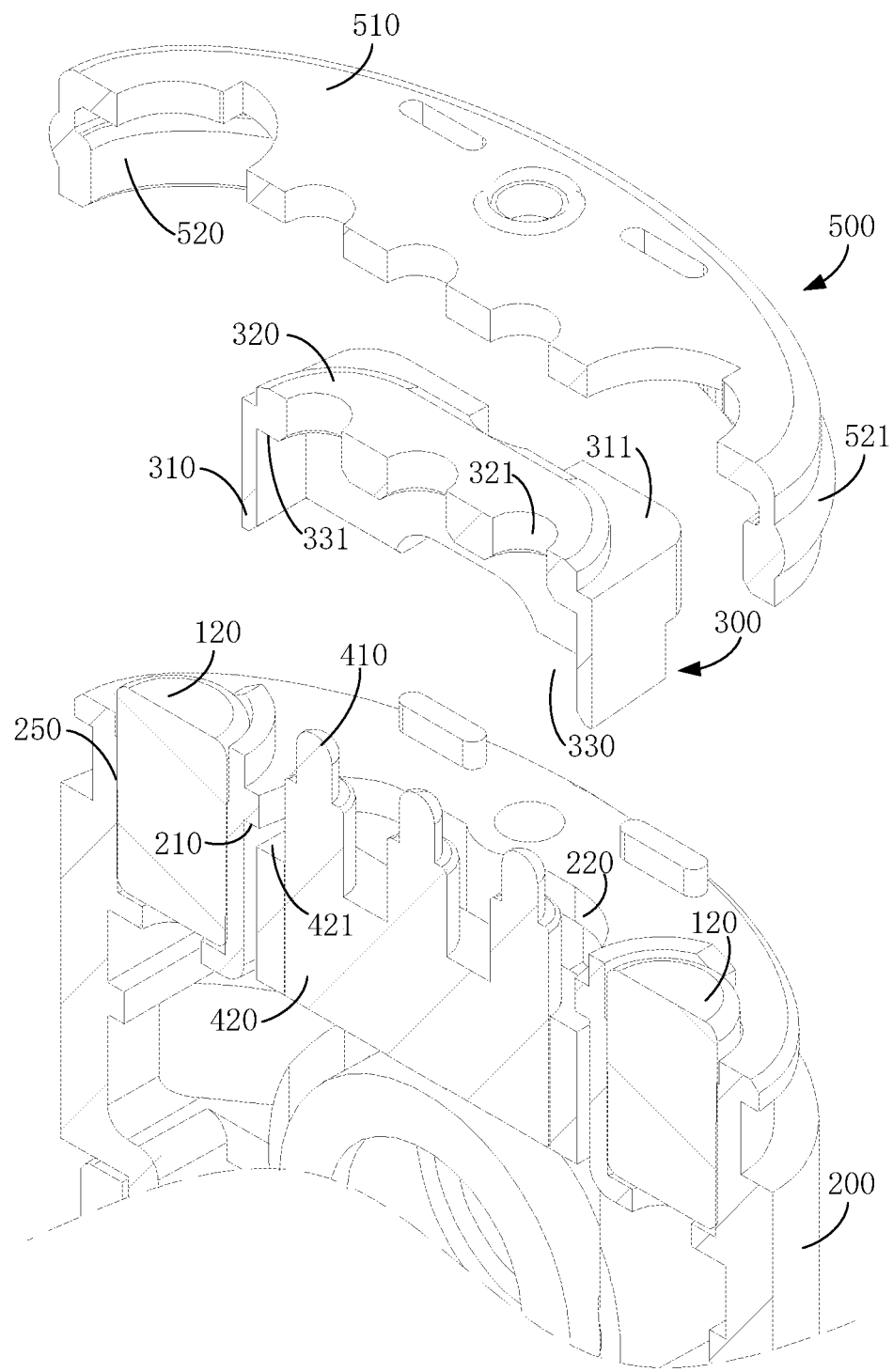
FIG. 10 is a partial schematic view of the power supply assembly of FIG. 9.
Figure 11:
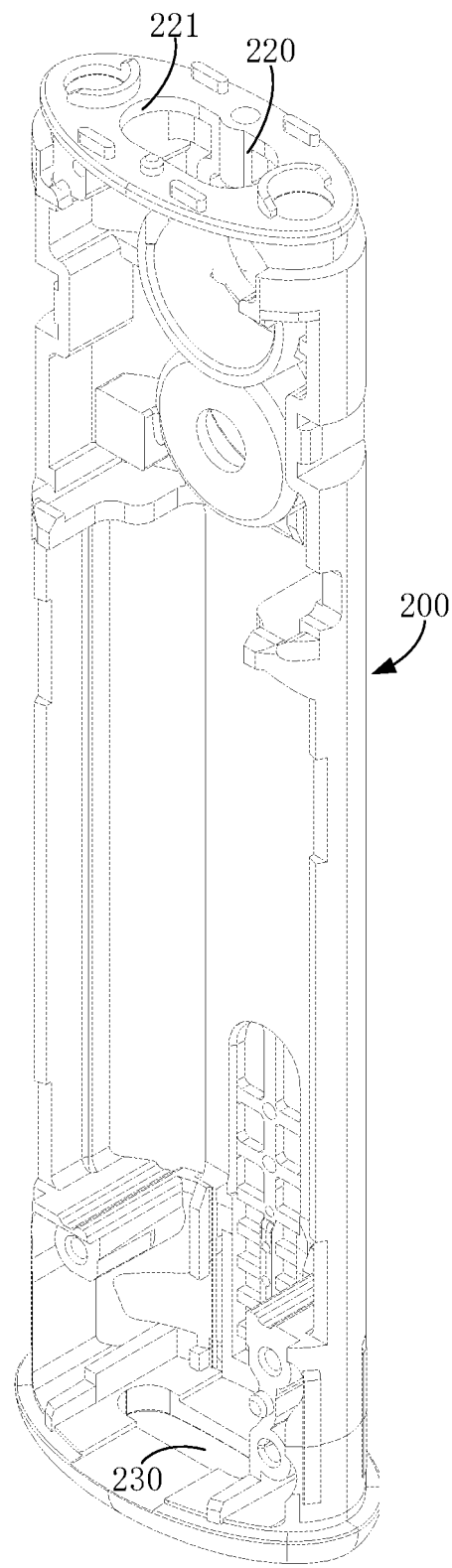
FIG. 11 is a perspective view of a support of the power supply assembly of FIG. 4.
Figure 12:
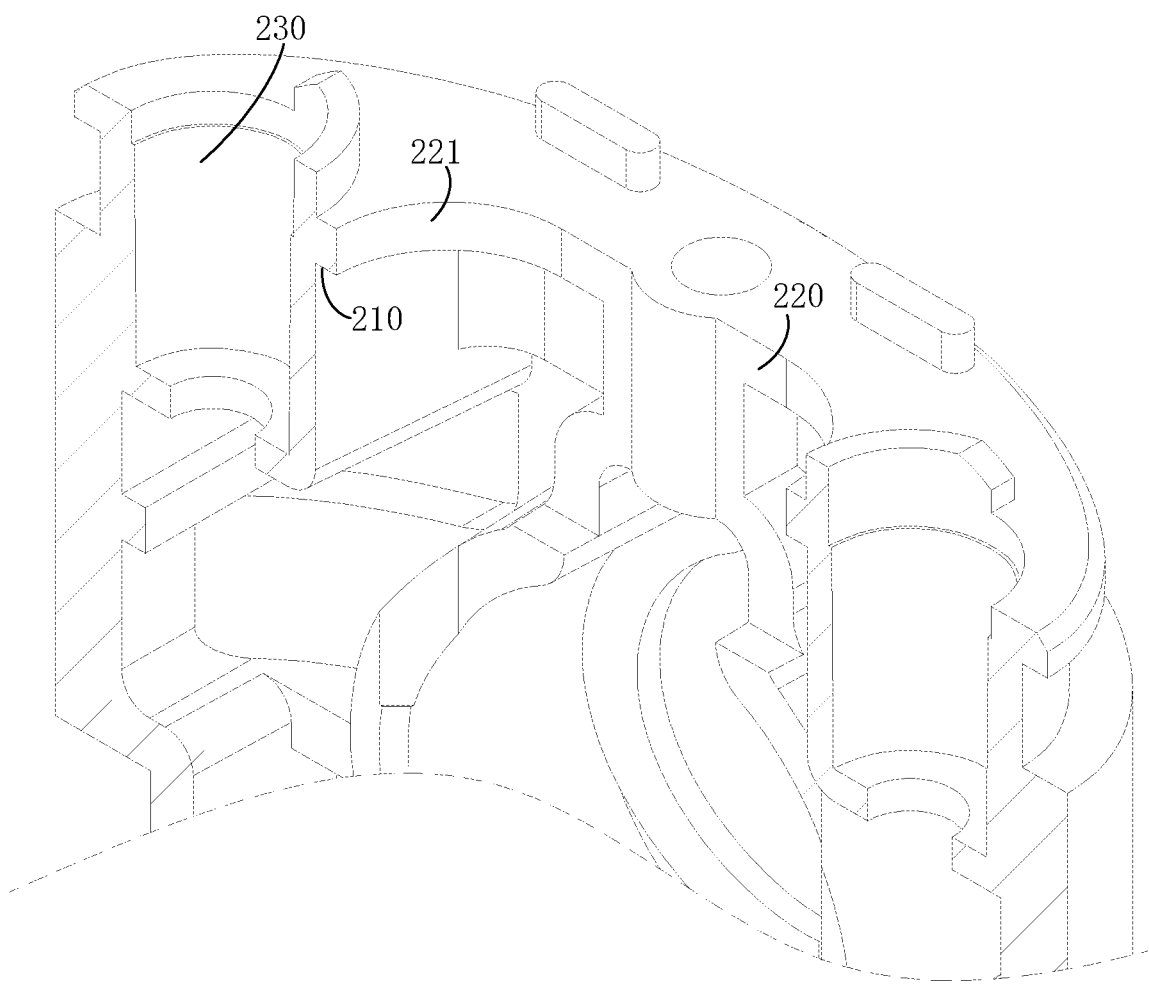
FIG. 12 is a partial perspective cross-sectional view of the support of FIG. 11.
Figure 13:
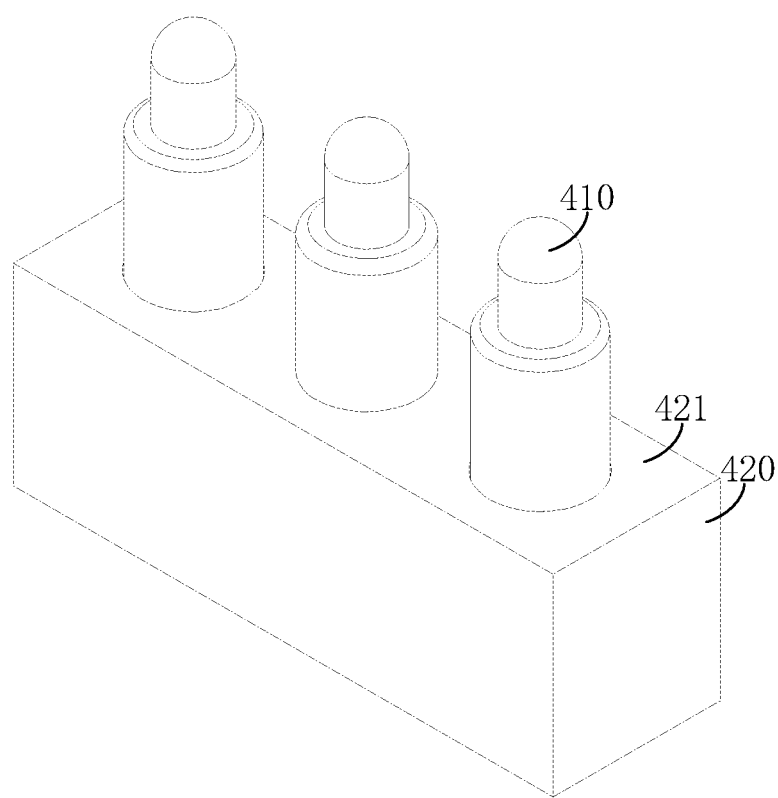
FIG. 13 is a perspective view of electrode posts of the power supply assembly of FIG. 4 connected to a mounting base.

Referring to FIGS. 11 and 12, in some embodiments, the support 200 has a first abutting surface 210. The first abutting surface 210 is provided with a mounting hole 220 thereon. The mounting hole 220 is disposed adjacent to the atomizer 20. Referring to FIG. 5, an extending direction of the mounting hole 220 is the same as an extending direction of the electrode post 410. In other words, an axial direction of the mounting hole 220 is the same as an axial direction of the electrode post 410. Obviously, a side wall surface of the mounting hole 220 is connected to the first abutting surface 210. The side wall surface of the mounting hole 220 may be provided vertically, and the first abutting surface 210 may be provided horizontally, so that the side wall surface and the first abutting surface 210 may be perpendicular to each other. Referring to FIGS. 10 and 13, the mounting base 420 has a second abutting surface 421. The second abutting surface 421 can also be provided horizontally, that is, the first abutting surface 210 and the second abutting surface 421 are parallel to each other. The electrode post 410 is connected to the mounting base 420 and protrudes a certain length relative to the second abutting surface 421.

Figure 8:
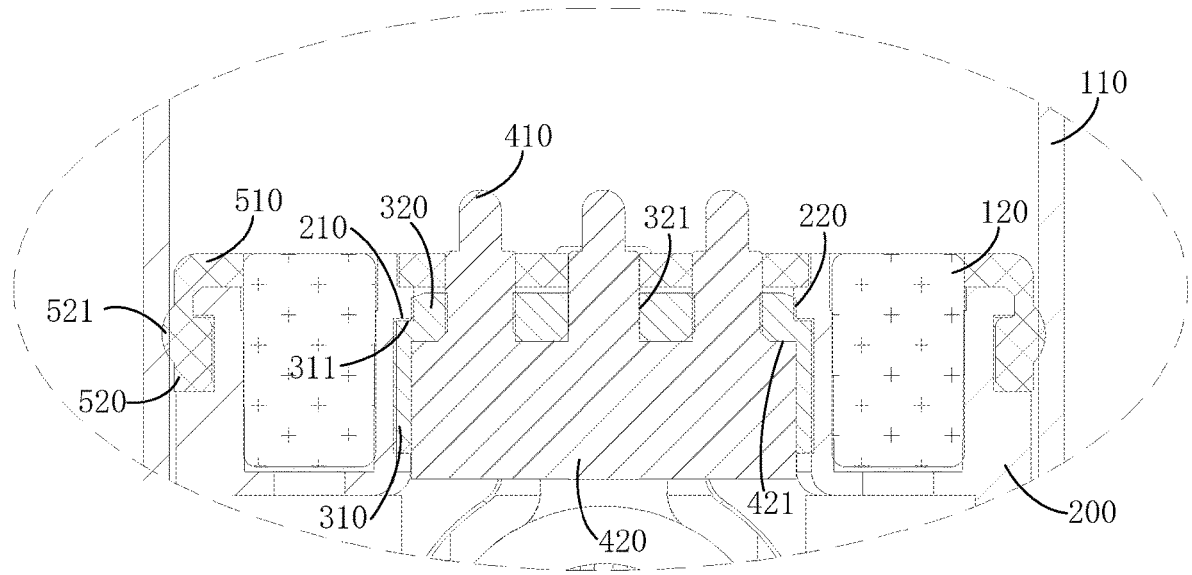
FIG. 8 is an enlarged schematic view of a portion A in FIG. 7.
Figure 9:
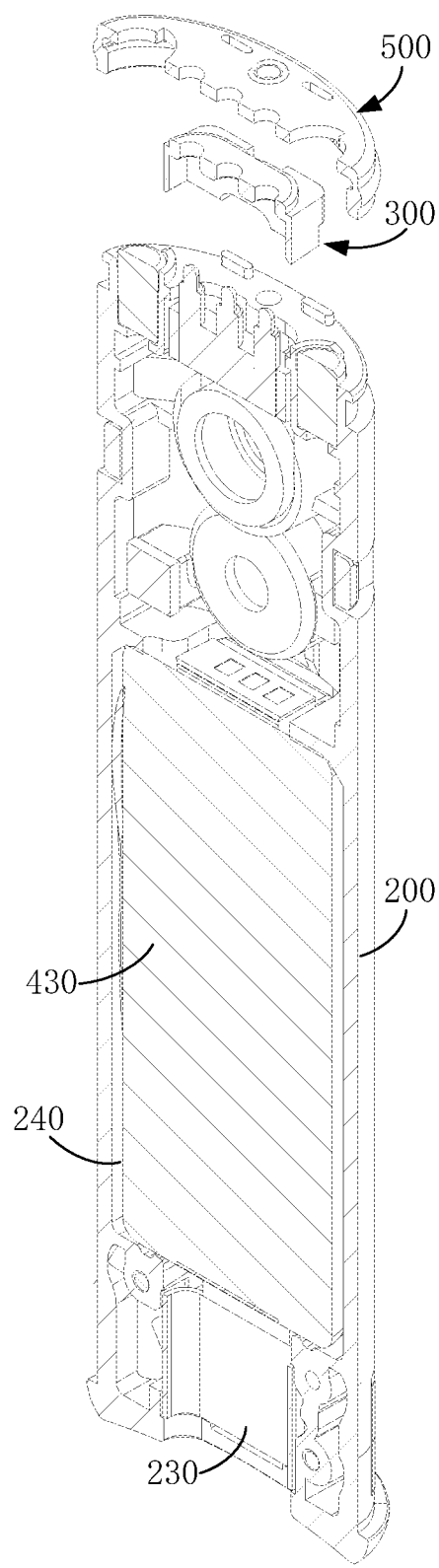
FIG. 9 is an exploded perspective cross-sectional view of the power supply assembly of FIG. 4, when a housing is removed.

Referring to FIGS. 8, 9, and 10, in some embodiments, the sealing member 300 is located in the support 200. The sealing member 300 is closer to the atomizer 20 than the battery 430. The sealing member 300 may be made of deformable materials. Preferably, the sealing member 300 is a silicone sealing member 300, that is, the sealing member 300 is made of silicone material, so that the sealing member 300 has certain flexibility and can be elastically deformed.

The sealing member 300 includes a base portion 310. The base portion 310 has a third abutting surface 311 that is provided horizontally. The base portion 310 is provided with an accommodating cavity 330 and through holes 321. The through holes 321 are disposed on the third abutting surface 311, and extend through a top wall surface 331 enclosing the accommodating cavity 330 to be in communication with the accommodating cavity 330. An axial direction of the through hole 321 is the same as the axial direction of the electrode post 410. Preferably, the sealing member 300 further includes a protrusion 320. A cross-sectional size of the protrusion 320 is smaller than a cross-sectional size of the base portion 310. The protrusion 320 is connected to the third abutting surface 311 and protrudes a certain length relative to the third abutting surface 311. The through holes 321 extend to the protrusion 320.

Figure 7:
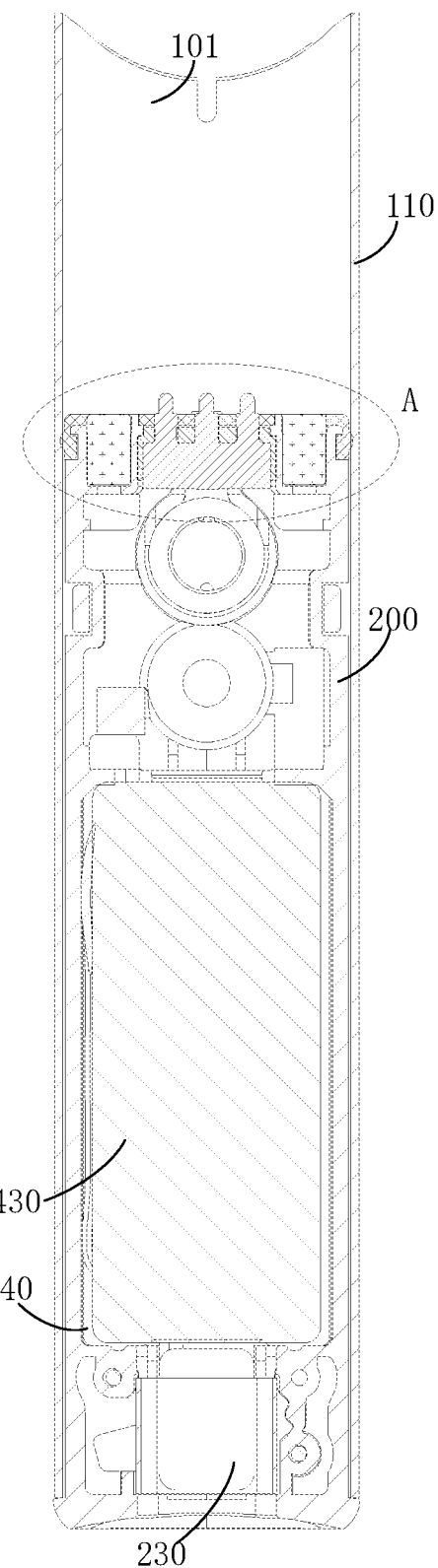
FIG. 7 is a planar cross-sectional view of the power supply assembly of FIG. 4 in an assembling state.
Figure 14:
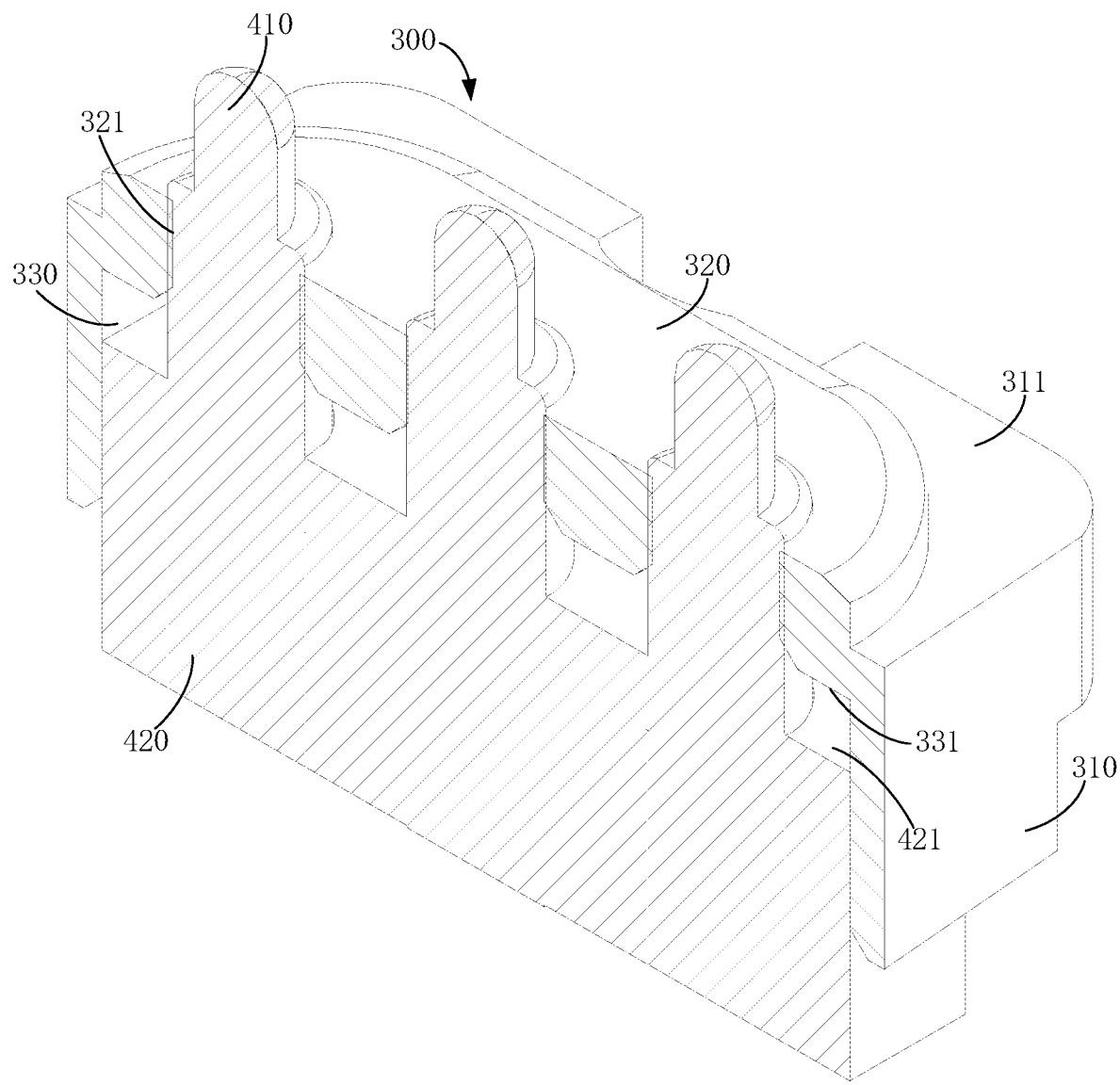
FIG. 14 is an exploded perspective cross-sectional view of a sealing member, the electrode posts, and the mounting base of the power supply assembly of FIG. 4.

Referring to FIGS. 7, 8, and 14, during assembly, the mounting base 420 is received in the accommodating cavity 330 of the base portion 310. The second abutting surface 421 of the mounting base 420 abuts against the top wall surface 331 enclosing the accommodating cavity 330, so as to position the mounting base 420. The electrode post 410 is disposed extending through the through hole 321. The electrode post 410 may be in a clearance fit with the through hole 321, or may be in an interference fit with the through hole 321. Referring to FIG. 10, moreover, the protrusion 320 of the sealing member 300 is fitted into the mounting hole 220 on the support 200, and both the third abutting surface 311 and the first abutting surface 210 can abut against each other.

When the battery 430 is in a normal state, the sealing member 300 is subjected to a pressure difference of less than a threshold pressure in the extending direction of the through hole 321 (in a vertical direction), and the sealing member 300 is not elastically deformed. When the battery 430 is in an abnormal state such as an explosion, the explosion of the battery 430 will cause the gas pressure in the support 200 to increase sharply, resulting in that the pressure difference acting on the sealing member 300 is greater than the threshold pressure. Under the action of the pressure difference, the sealing member 300 is elastically deformed. As a result, an aperture of the through hole 321 becomes smaller, so that the electrode post 410 and the through hole 321 will form an interference fit with a greater amount of interference. Generally speaking, the sealing member 300 will form a "tightening" effect on the electrode post 410, thereby eliminating a gap between the electrode post 410 and the sealing member 300 in the through hole 321, preventing harmful gas generated by the explosion of the battery 430 from entering the atomizer 20 through the gap and from being inhaled by the user, and improving the safety of the electronic atomizing device 10. It is also possible to prevent the high-pressure gas in the support 200 from acting on the atomizer 20 through the gap, that is, to prevent the high-pressure gas from generating an impact force on the atomizer 20, so that the impact force is prevented from overcoming the magnetic attraction and thus releasing the atomizer 20 from the mounting cavity 101, which further avoids the quickly released atomizer 20 from causing injury to the user.

In other embodiments, in the case that the entire atomizer 20 and the power supply assembly 30 are in a non-detachable connection, the atomizer 20 can also be prevented from being released. Moreover, since the support 200 is provided with the exhaust hole 230 in communication with the receiving cavity 240, the high-pressure gas generated by the battery 430 can be exhausted from the exhaust hole 230 to the outside, so as to rapidly reduce the pressure in the receiving cavity 240, which can also improve the safety of the electronic atomizing device 10. Of course, the exhaust hole 230 may further be provided with a universal serial bus (USB) interface electrically connected to the battery 430. When the USB interface is connected to an external charging device through a power line, the charging device can charge the battery 430 through the USB interface.

When the pressure difference acting on the sealing member 300 is greater than the threshold pressure such that the sealing member 300 is elastically deformed, a strong abutting pressure is formed between the third abutting surface 311 and the first abutting surface 210. In this case, the protrusion 320 is deformed, so that a cross-sectional size of the protrusion 320 is increased so that the protrusion 320 is in an interference fit with the mounting hole 220, that is, the support 200 has a "tightening" effect on the protrusion 320. On the one hand, the sealing member 300 can be prevented from being released from the support 200 under the impact of high-pressure gas due to the limiting of the first abutting surface 210; on the other hand, the gap between the third abutting surface 311 and the first abutting surface 210, and the gap between the protrusion 320 and the support 200 in the mounting hole 220 can be eliminated, thereby preventing harmful high-pressure gas from entering the atomizer 20 from the two gaps or causing an impact on the atomizer 20. Furthermore, since the second abutting surface 421 of the mounting base 420 abuts against the top wall surface 331 of the sealing member 300 enclosing the accommodating cavity 330, the mounting base 420 can be effectively prevented from moving towards the atomizer 20 due to the limiting of the top wall surface 331, and thus the mounting base 420 is prevented from driving the electrode post 410 to move and from generating a larger abutting force against the electrode contact in the atomizer 20. In addition, the elastic deformation of the sealing member 300 will also absorb the strong abutting energy between the electrode post 410 and the electrode contact, thereby preventing the electrode post 410 and the electrode contact from being damaged.

In some embodiments, the threshold pressure is in a range of 1 KPa to 2 MPa. For example, the threshold pressure may specifically be 1 KPa, 100 KPa, 1.5 MPa, 2 MPa, or the like. The threshold pressure can also be in a range of 2 KPa to 2 MPa, or 10 KPa to 1 MPa. When the threshold pressure is in the range of 10 KPa to 1 MPa, on the one hand, deformation of the sealing member 300 caused by excessive suction force of the user can be avoided, and on the other hand, it is possible to enable the sealing member 300 to be deformed in time to form an interference fit between the electrode post 410 and the through hole 321 in an early stage of the explosion of the battery 200. When the pressure difference acting on the sealing member 300 is greater than the threshold pressure, the interference between the electrode post 410 and the through hole 321 is in a range of 0.01 mm to 0.1 mm. For example, the interference may specifically be 0.01 mm, 0.05 mm, 0.08 mm, 0.1 mm, or the like. The greater the interference, the stronger the "tightening" effect the sealing member 300 will have on the electrode post 410. The so-called interference can be interpreted as a difference between a diameter of the electrode post 410 and a diameter of the through hole 321. For example, when the interference is 0.05 mm, the diameter of the electrode post 410 is greater than the diameter of the through hole 321 by 0.05 mm.

Referring to FIGS. 8, 9, and 10, in some embodiments, the protective cover 500 can also be made of silicone material. The protective cover 500 includes a bottom plate portion 510 and a side cylinder portion 520. The side cylinder portion 520 is disposed around the bottom plate portion 510. An end of the support 200 adjacent to the atomizer 20 is sleeved in the side cylinder portion 520. The housing 110 is sleeved outside the side cylinder portion 520. In other words, the side cylinder portion 520 is clamped between the support 200 and the housing 110. A boss 521 is provided on a surface of the side cylinder portion 520. The boss 521 presses against an inner wall surface of the housing 110, that is, the boss 521 forms an interference fit with the cavity enclosed by the housing 110, which eliminates a clearance between the side cylinder portion 520 and the housing 110, so that the boss 521 seals the cavity enclosed by the housing 110, ensuring that the harmful high-pressure gas generated by the battery 430 cannot enter the atomizer 20 through the clearance or impact the atomizer 20. Moreover, the bottom plate portion 510 covers the sealing member 300. The bottom plate portion 510 can protect the sealing member 300 to a certain extent. The electrode post 410 extends through the bottom plate portion 510. The electrode post 410 can maintain an interference fit with a via hole formed on the bottom plate portion 510, so that the protective cover 500 and the sealing member 300 have a double sealing effect, which further improves the safety of the electronic atomizing device 10. When the atomizer 20 is located in the mounting cavity 101, a bottom of the atomizer 20 can be in contact with the bottom plate portion 510.

The technical features of the embodiments as described above can be arbitrarily combined. In order to make the description concise, there is no describing of all possible combinations of the various technical features in the foregoing embodiments. It should be noted that there is no contradiction in the combination of these technical features which should be considered as the scope of the description.

Although the present disclosure is illustrated and described herein with reference to specific embodiments, the present disclosure is not intended to be limited to the details shown. It is to be noted that, various modifications may be made in the details within the scope and range of equivalents of the claims and without departing from the present disclosure. Therefore, the protection scope of the present disclosure shall be subject to the protection scope of the claims.

What is claimed is:

1. A power supply assembly of an electronic atomizing device, configured to supply energy to an atomizer of the electronic atomizing device, the power supply assembly comprising:
    a battery and an electrode post electrically connected to the battery, the battery supplying power to the atomizer through the electrode post;
    a sealing member provided with a through hole, the electrode post extending through the through hole; and
    a support having a first abutting surface, the battery and the sealing member being disposed in the support;
    wherein when a difference between a pressure of one end of the sealing member adjacent to the battery and a pressure of the other end of the sealing member away from the battery is greater than a threshold pressure, the sealing member presses against the first abutting surface, and the sealing member is deformed to seal a clearance between the electrode post and the sealing member in the through hole.

2. The power supply assembly according to claim 1, wherein the threshold pressure is in a range of 1 KPa to 2 MPa.

3. The power supply assembly according to claim 2, wherein the threshold pressure is in a range of 2 KPa to 2 MPa.

4. The power supply assembly according to claim 3, wherein the threshold pressure is in a range of 10 KPa to 1 MPa.

5. The power supply assembly according to claim 1, wherein when a pressure difference acting on the sealing member is greater than the threshold pressure, the electrode post and the through hole are in an interference fit, and an interference between the electrode post and the through hole is in a range of 0.01 mm to 0.1 mm.

6. The power supply assembly according to claim 1, further comprising a circuit board disposed in the support, the electrode post being electrically connected to the circuit board.

7. The power supply assembly according to claim 6, further comprising a mounting base mounted on the circuit board, and the electrode post being fixed on the mounting base.

8. The power supply assembly according to claim 7, wherein the mounting base has a second abutting surface, the electrode post protrudes with respect to the second abutting surface, the sealing member is further provided with an accommodating cavity, the through hole is disposed on a top wall surface enclosing the accommodating cavity, the mounting base is sleeved in the accommodating cavity, and the second abutting surface abuts against the top wall surface.

9. The power supply assembly according to claim 1, wherein the first abutting surface is provided with a mounting hole, when the difference between the pressure of the end of the sealing member adjacent to the battery and the pressure of the other end of the sealing member away from the battery is greater than the threshold pressure, the sealing member is deformed to be in an interference fit with the mounting hole.

10. The power supply assembly according to claim 9, wherein the sealing member comprises a base portion having a third abutting surface, the through hole is disposed on the base portion, and the third abutting surface is capable of pressing against the first abutting surface.

11. The power supply assembly according to claim 10, wherein the sealing member further comprises a protrusion disposed on the third abutting surface, the through hole extends to the protrusion, the protrusion is capable of being deformed to be in an interference fit with the mounting hole.

12. The power supply assembly according to claim 1, wherein the sealing member comprises a silicone sealing member.

13. The power supply assembly according to claim 1, further comprising a protective cover, wherein the protective cover comprises a bottom plate portion and a side cylinder portion connected around the bottom plate portion, the side cylinder portion is sleeved on the support, the bottom plate portion covers the sealing member, and the electrode post extends through the bottom plate portion.

14. The power supply assembly according to claim 1, further comprising a housing, wherein the support is sleeved in the housing, the housing and the support enclose a mounting cavity, a portion of the electrode post protruding from the sealing member is located in the mounting cavity, and the mounting cavity is configured to be matched with the atomizer.

15. The power supply assembly according to claim 14, wherein the support and the housing enclose a receiving cavity configured to receive the battery, the support is provided with an exhaust hole, and the exhaust hole provides a communication between the outside and the receiving cavity.

16. An electronic atomizing device, comprising an atomizer and the power supply assembly of claim 1, the atomizer being connected to the power supply assembly.

17. The electronic atomizing device according to claim 16, further comprising a magnetic attraction member disposed on the support and magnetically connected to the atomizer.

18. The electronic atomizing device according to claim 16, wherein when a pressure difference acting on the sealing member is greater than the threshold pressure, the electrode post and the through hole are in an interference fit, and an interference between the electrode post and the through hole is in a range of 0.01 mm to 0.1 mm.

19. The electronic atomizing device according to claim 16, wherein the power supply assembly further comprises a circuit board disposed in the support, and a mounting base mounted on the circuit board, and wherein the electrode post is electrically connected to the circuit board, and the electrode post is fixed on the mounting base.

20. The electronic atomizing device according to claim 16, wherein the first abutting surface is provided with a mounting hole, when the difference between the pressure of the end of the sealing member adjacent to the battery and the pressure of the other end of the sealing member away from the battery is greater than the threshold pressure, the sealing member is deformed to be in an interference fit with the mounting hole.

* * * * *